United States Patent [19]

Bescherer et al.

[11] Patent Number: 5,452,682
[45] Date of Patent: Sep. 26, 1995

[54] BIRD FEEDER

[75] Inventors: Robert E. Bescherer, Bristol; Barry D. Colvin, Hope, both of R.I.

[73] Assignee: Aspects, Inc., Warren, R.I.

[21] Appl. No.: 218,051

[22] Filed: Mar. 25, 1994

[51] Int. Cl.⁶ .................................................. A01K 39/00
[52] U.S. Cl. ........................................................ 119/57.8
[58] Field of Search ........................... 119/57.8, 52.1, 119/52.2, 52.4, 54

[56] References Cited

U.S. PATENT DOCUMENTS

| | | | |
|---|---|---|---|
| D. 262,917 | 2/1982 | Kilham | D30/14 |
| 2,705,938 | 4/1955 | Greenough | 119/52 |
| 4,829,934 | 5/1989 | Blasbalg | 119/57.8 |
| 4,896,628 | 1/1990 | Kadunce | 119/52.7 |
| 4,996,947 | 3/1991 | Petrides | 119/57.9 |
| 5,215,039 | 6/1993 | Bescherer et al. | 119/57.8 |

*Primary Examiner*—Gene Mancene
*Assistant Examiner*—Thomas Price
*Attorney, Agent, or Firm*—Barlow & Barlow, Ltd.

[57] ABSTRACT

A tubular feeder having a cylindrical body and a lower wall for holding feed is provided. A perch extender with a diametrical slot mates with the bottom of the feeder where the perch extender is keyed to the bottom of the feeder. The perch extender can be stored over the bail of feeder. The tubular feeder provides a perch below a lowermost feeding opening.

5 Claims, 1 Drawing Sheet

BIRD FEEDER

BACKGROUND OF THE INVENTION

The present invention relates to a cylindrical bird feeder in which the lower feeding openings are positioned at the extreme bottom of the cylindrical tube of the bird feeder, essentially adjacent to the bottom wall.

Cylindrical bird feeders are all fairly conventional and provide perches located a certain distance below each feeder opening. The Kilham patent, U.S. Pat. No. 3,568,641 discloses a typical cylindrical bird feeder but it does not provide or attempt to enable a bird to eat all of the seed in the cylindrical tube.

One bird feeder, as seen in the Greenough patent, U.S. Pat. No. 2,705,938, has an opening at the base of the cylindrical tube for birds to feed. The difficulty with this particular construction lies in the fact that there are no perches in the form, for example, of horizontal bars that protrude a certain distance below each feeding opening.

SUMMARY OF THE INVENTION

There are many types of birds that prefer to feed upon thistle seed, as for example Goldfinches, and this invention is particular directed to a thistle seed feeder for that type of bird. To this end, the present invention relates to a tubular feeder having a cylindrical body which is closed with a top cap and bottom wall and has in the wall of the cylindrical body, feeding openings with perches located a finite distance therebelow. The feeder features at least one lower most feeding opening at the bottom end of the cylindrical hollow body adjacent to the bottom wall and the feeder has a perch extender consisting essentially of a top wall with a circular side wall, the top wall being arranged to nest into the bottom wall of the tubular feeder. Of particular importance in the structure is that the perch extender is provided with a diametral slot in the top wall thereof while the bottom wall of the feeder tube is provided with locating means, the slot in the top wall of the extender engaging the locating means. The locating means further ensures that the lowermost feed hole is aligned with the perch on the perch extender. To provide adequate storage for the perch extender, the slot is also configured so that it may slip over a bail that would be provided at the upper end of the cylindrical body for hanging the feeder, the slot slipping over that bail.

It is a primary object of the present invention to provide a simple means of constructing a perch for a lower opening at the body end of a hollow body. It is a further object of the present invention to provide a perch extender construction which also may be readily stored over the top of the tubular feeder.

DETAILED DESCRIPTION OF THE PREFERRED EMBODIMENT

Figure 1:
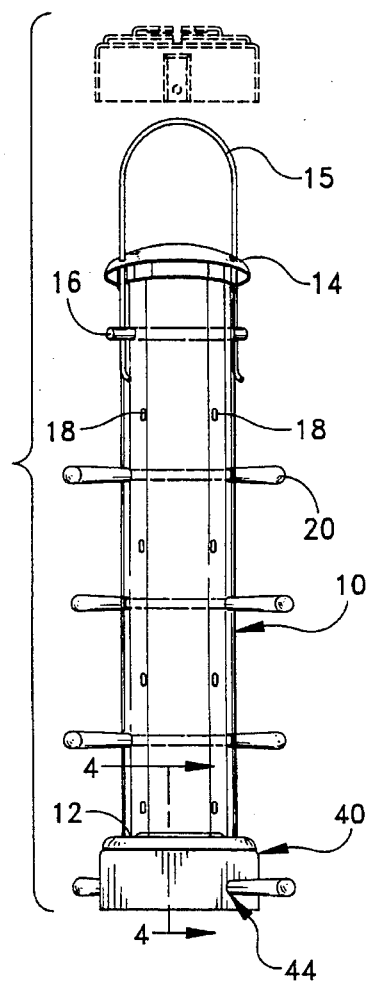
FIG. 1 is a detached perspective view of the tubular feeder made in accordance with our invention with the perch extender in phantom at the top about to be placed over the hanging bail of the tubular feeder.

Referring to FIG. 1, the general structure of the thistle feeder of the present invention is illustrated. The cylindrical body 10 can be made out of a variety of materials and preferably, a clear plastic to which there will be provided a bottom wall 12 in the form of a circular plug and a top cap 14 which is removable and which, together with the bottom wall, retain the feed within the body. At the top of the body is a hanger 15 in the form of a bail which is held in place by a diametral pin 16 that passes through the body 10. The bail will be slidably received in a aperture in the end of the pin 16 so the bail may slide up and down relative to the body.

A plurality of feeding apertures, such as 18, are provided in the wall of the cylindrical body and directly under each feeding opening 18 will be positioned a perch 20 which is a single member which is insertable through body 10. For the most part, the perches 20 are inserted through the body 10 across a diameter thereof and as can be seen in the drawing, they alternate along different diameters so that they are essentially perpendicular to each other as they traverse the extent of the body 10. Each perch is arranged to protrude from the wall of the body 10 and may be made of metallic material or plastic.

Figure 2:
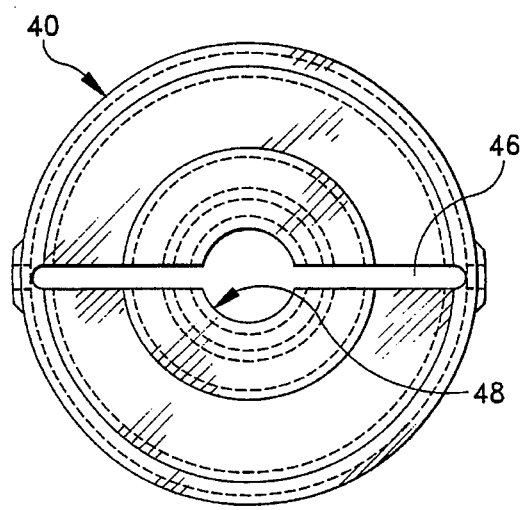
FIG. 2 is a top view of the perch extender.
Figure 3:
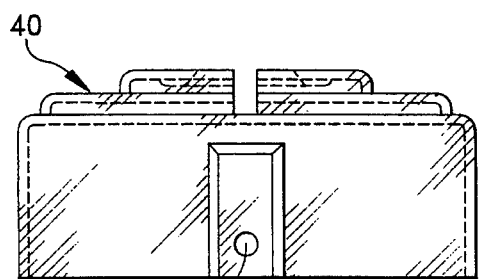
FIG. 3 is a side elevational view of the perch extender.
Figure 4:
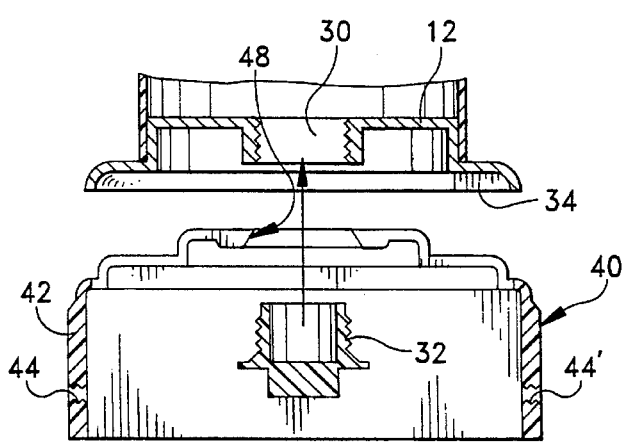
FIG. 4 is a detached view illustrating the assembly of the perch extender to the bottom wall of the feeder.
Figure 5:
FIG. 5 is a side elevational view of a threaded perch for insertion into the perch extender of FIG. 3.

The bottom wall 12 of the feeder, which is seen more particularly in FIG. 4 showing a cross-sectional view of bottom wall 12 perch extender 40 and plug 32 through line 4—4 of FIG. 1, is made with a central clean-out opening 30 into which is received a threaded plug 32. The bottom wall is shaped somewhat as an inverted cup and on the inner periphery is located a key 34. The perch extender 40 is also made of an extended length and is of a cup-shaped formation having a cylindrical wall 42 through which a pair of female threaded openings 44, 44' are placed and into which suitable threaded perches 50 with male threads 52, as shown in FIG. 5, may be received. The top wall of the perch extender is formed so as to nest in the bottom wall of the feeder and has a diametral opening 46, as seen in FIG. 2, and a central opening 48. The plug 32 is adapted to be received through the opening 48, the plug retaining the perch extender in the position as seen in FIG. 1. Essentially, the slot 46 serves along with the key 34 as means of locating the extender in the proper position so that the perches will lie underneath the feeding opening at the bottom end of the cylindrical tube. When not in use, perch extender 40 may be stored on top cap 14 of the bird feeder cylindrical body 10 by extending hanger 15 through diametrical opening 46.

It will be appreciated by those skilled in the art that various changes and modifications can be made to the illustrated embodiments without departing from the spirit of the present invention. All such modifications and changes are intended to be covered by the appended claims.

We claim:

1. A tubular feeder, comprising:

a cylindrical body having a bottom end with a top cap and bottom wall and a plurality of perches and corresponding feeding openings through the cylindrical body including at least one lowermost feeding opening at the bottom end of the cylindrical body adjacent the bottom wall; and a perch extender having a top wall and a cylindrical wall; said top wall being in a substantially complimentary mate with the bottom wall of the cylindrical body, locating means for rotationally keying said cylindrical body to said perch extender in the bottom wall of the feeder, slot means for communicating with said locating means in the top wall of the perch extender, said slot means engaging the locating means, at least a pair of perches in the cylindrical wall of the perch extender and means for fastening the extender to the bottom wall of the feeder; engagement of said slot means with said locating means rotationally keying said perch extender to said cylindrical body to vertically align said perches in the cylindrical wall of the perch extender with said at least one lowermost feeding opening.

2. The tubular feeder as in claim 1 wherein the slot means in the top wall of the perch extender is a diametrical slot and wherein the top cap of the cylindrical body includes a bail, said perch extender being adapted to be stored over the bail by extending the bail through the diametrical slot thereof.

3. The tubular feeder as in claim 1 wherein the fastening means is a threaded fastener engaging the bottom wall of the tubular feeder.

4. A tubular feeder, comprising:

a cylindrical body having a bottom end with a top cap and bottom wall and a plurality of perches and corresponding feeding openings in the cylindrical body including at least one lowermost feeding opening at the bottom end of the cylindrical body adjacent the bottom wall; and a perch extender having a top wall and a cylindrical wall; said top wall being in a substantially complimentary mate with the bottom wall of the cylindrical body, locating means for rotationally keying said cylindrical body to said perch extender in the bottom wall of the feeder, slot means for communicating with said locating means in the top wall of the perch extender, said slot means engaging the locating means, at least a pair of perches in the cylindrical wall of the perch extender and a threaded fastener engaging the bottom wall of the tubular feeder to fasten the perch extender to the bottom wall of the feeder.

5. The tubular feeder as in claim 4, wherein the slot means in the top wall of the perch extender is a diametrical slot and wherein the top cap of the cylindrical body includes a bail, said perch extender being adapted to be stored over the bail by extending the bail through the diametrical slot thereof.

* * * * *